(12) United States Patent
Singh

(10) Patent No.: US 8,230,476 B2
(45) Date of Patent: Jul. 24, 2012

(54) REAL-TIME INTERACTIVE PERSONAL VIDEO RECORDER INTERFACE

(75) Inventor: Dave P. Singh, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 1956 days.

(21) Appl. No.: 10/245,952

(22) Filed: Sep. 17, 2002

(65) Prior Publication Data

US 2004/0052499 A1    Mar. 18, 2004

(51) Int. Cl.
*H04N 7/16* (2011.01)
(52) U.S. Cl. ............ 725/136; 725/34; 725/46; 725/133; 725/135; 725/141; 434/322; 434/323
(58) Field of Classification Search .................. 725/133, 725/136, 141, 34, 46, 135; 434/322, 323
See application file for complete search history.

(56) References Cited

U.S. PATENT DOCUMENTS

| | | | | |
|---|---|---|---|---|
| 5,613,909 A | * | 3/1997 | Stelovsky | 463/1 |
| 5,782,692 A | * | 7/1998 | Stelovsky | 463/1 |
| 5,859,662 A | * | 1/1999 | Cragun et al. | 725/137 |
| 6,125,230 A | * | 9/2000 | Yaginuma | 386/83 |
| 6,193,610 B1 | * | 2/2001 | Junkin | 463/40 |
| 6,360,195 B1 | * | 3/2002 | Liao et al. | 703/28 |
| 7,079,176 B1 | * | 7/2006 | Freeman et al. | 348/207.1 |
| 7,293,279 B1 | * | 11/2007 | Asmussen | 725/102 |
| 2002/0049596 A1 | * | 4/2002 | Burchard et al. | 704/270 |
| 2002/0056136 A1 | * | 5/2002 | Wistendahl et al. | 725/135 |
| 2002/0078006 A1 | * | 6/2002 | Shteyn | 707/1 |
| 2003/0067554 A1 | * | 4/2003 | Klarfeld et al. | 348/461 |

OTHER PUBLICATIONS

Webster's II new Riverside university dictionary ISBN:0-395-33957-X, 1984.*
Asmussen, Michael L., Advanced Set Top Terminal Having a Program Pause Feature for Interactive Services, Jun. 7, 2000 U.S. Appl. No. 09/588,503 Specification pp. 1-80.*

* cited by examiner

*Primary Examiner* — Pankaj Kumar
*Assistant Examiner* — Sahar Baig
(74) *Attorney, Agent, or Firm* — Trop, Pruner & Hu, P.C.

(57) ABSTRACT

Interacting with a television program includes beginning playback of the program for perception by a user, analyzing the program to detect a cue within the program, automatically pausing playback of the program when the cue is detected, accepting user input data in response to the cue, resuming playback of the program when the user input data is received, and comparing the user input data to a non-user response. Interactivity provided by the program analysis, pausing playback, accepting user input data, resuming playback, and comparing operations supports execution of at least one of an entertainment application and an educational application at a user's site without requiring modification of the television program by a program provider.

31 Claims, 3 Drawing Sheets

REAL-TIME INTERACTIVE PERSONAL VIDEO RECORDER INTERFACE

BACKGROUND

1. Field

The present invention relates generally to personal video recorder (PVR) systems and, more specifically, to interacting with a television (TV) program.

2. Description

Recording of TV programs using analog or digital means is widespread. Video cassette recorders (VCRs) are used by millions of people to record their favorite TV programs. Recently, devices for recording of TV programs using digital means have been introduced. These devices, also known as personal video recorders (PVRs), store selected TV programs in a digital format on a storage medium such as a computer hard drive. PVRs typically include the capability of pausing the playback of a program currently being received. The pause request is typically communicated to the PVR by the user using a remote control device. While playback of the program is being paused, the PVR still receives and stores the broadcast program. When the user selects to resume playback, the PVR resumes playback of the program at the paused point, and then continues with playback until the end of the program is reached or until another user input is received. PVRs accept direct input from users with respect to scheduling programs to record, and to control functions such as pause and resume, but do not support real-time interactivity with a TV program.

BRIEF DESCRIPTION OF THE DRAWINGS

The features and advantages of the present invention will become apparent from the following detailed description of the present invention in which.

DETAILED DESCRIPTION

Embodiments of the present invention comprise methods and apparatus that supplement digital video recording capabilities to enable real-time interaction with TV programs. Embodiments of the invention may be useful for entertainment and educational applications such as gaming and training, although the invention is not limited in this respect. Embodiments of the invention enhance the PVR's basic functionality of a passive archiving activity to an active, immediate response activity. With the present invention, content (e.g., a TV program) received by a recording and control device such as a PVR may be linked to other applications for an enhanced user experience. PVRs currently only accept direct input from users. PVRs cannot intelligently respond to cues within broadcast content (e.g., TV programs). In addition, PVRs are not currently designed to interact with other devices such as tablets, personal digital assistants (PDAs), personal computer (PC) applications, or web sites. Embodiments of the present invention analyze the TV program signal to detect a cue, automatically trigger a PVR function such pause in response to detection of the cue, resume playback upon receiving user input data associated with the cue, and correlate the user input data with responses embedded within the program.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
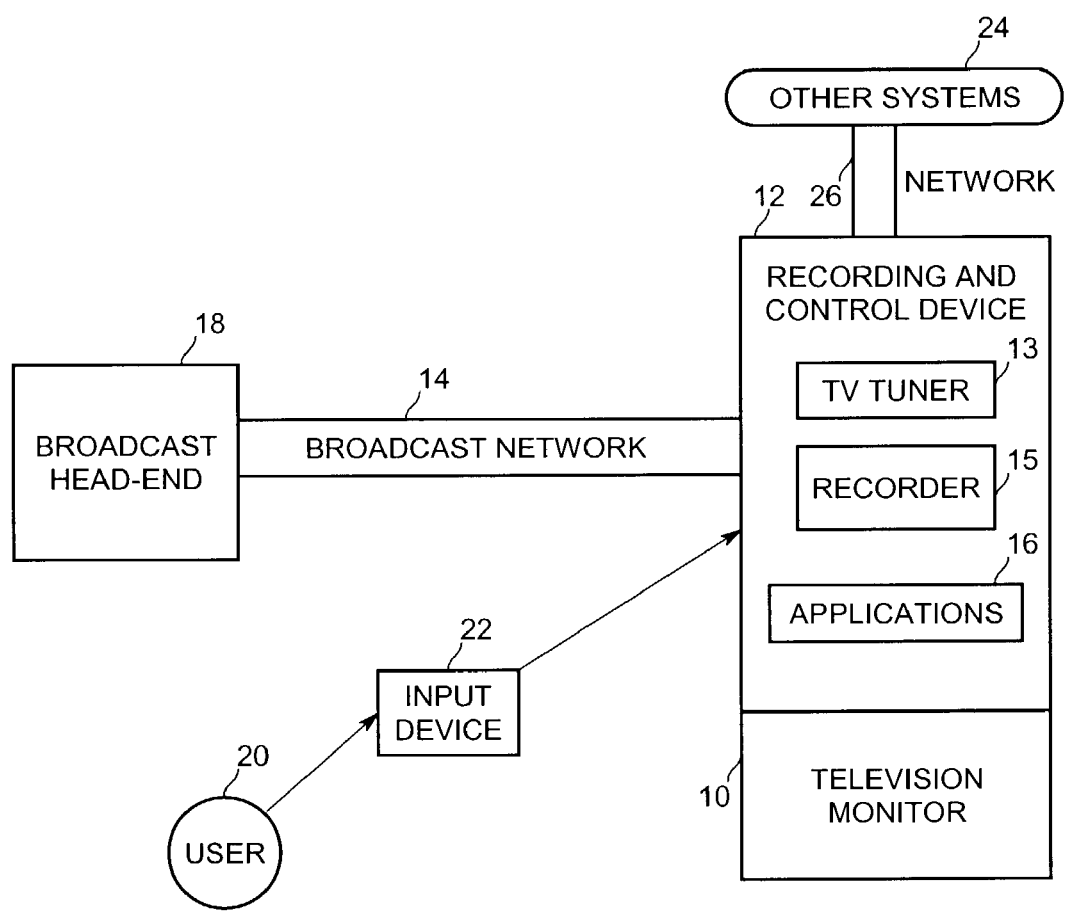
FIG. 1 is a diagram of a system environment for interacting with a recording and control device and TV programs according to an embodiment of the present invention.

FIG. 1 is a diagram of a system environment for interacting with a recording and control device and TV programs according to an embodiment of the present invention. A television (TV) monitor 10 may be coupled to a recording and control device 12 for receiving analog or digital TV (DTV) broadcasts via a broadcast network 14. The recording and control device may be configured to receive analog or digital broadcast TV signals via a broadcast network comprising an antenna, cable, satellite dish, a computer network (such as the Internet for example), or any other suitable transmission mechanism. Broadcast head-end 18 broadcasts the TV signal to recording and control device 12 over broadcast network 14 using well-known methods. In various embodiments, the recording and control device may comprise a PVR, a personal computer (PC), a set-top box, a home server, or other consumer electronics device. In other embodiments, the TV program may be communicated via a closed circuit transmission network to one or more individual recording and control devices and not broadcast.

In one embodiment, recording and control device 12 comprises a TV tuner 13 to tune reception of the TV signal to a particular channel in a conventional manner. The recording and control device may also comprise a recorder 15. Recorder 15 comprises a device or function for the recording, via either analog or digital means, of TV programs received by the recording and control device over the broadcast network. Recorder 15 may be embodied in software, hardware, or any combination of the two. Recording of TV programs by recorder may be accomplished by conventional, well-known techniques. Recording and control device 12 determines, as a result of viewer interaction and/or electronic programming guides (EPGs), which programs and/or program segments to record. The recording and control device may accordingly control the operation of the recorder in recording programs. In some embodiments, the recording and control device may be integral with the TV 10 or other associated consumer electronics or computer products. In various embodiments, the recorder may provide the well-known functionality of a PVR.

Recording and control device 12 may also comprise one or more applications 16. Applications 16 provide additional functionality for the system that has value for a user 20, such as an entertainment application (e.g., a game), an educational application (e.g., a training program), or other application. Applications 16 may be embodied in software, hardware, or any combination of the two. The application may, in various embodiments, be integral with the recording and control device or may be loaded into a memory (e.g., a random access memory (RAM) of the device from a storage medium (e.g., a CD-ROM, a DVD-ROM, and a floppy disk)(not shown in FIG. 1)).

In embodiments of the present invention, user 20 may interact with the recording and control device using input device 22. Input device 22 may comprise one or more of a remote control device, a mouse, a trackball, a joystick, a personal digital assistant (PDA), a cell phone, a tablet, or any other user interface mechanism suitable for inputting commands and data to the recording and control device. Recording and control device 12 may also interact with other systems 24 over a network 26. In one embodiment, the other systems comprise one or more server computer systems (e.g., web servers) and the network comprises the World Wide Web (WWW) of the Internet. In other embodiments, other systems 24 comprise other computing devices and the network comprises any communications network.

In an embodiment of the present invention, the recording and control device recognizes one or more cues in the broadcast TV signal received over the broadcast network, triggers PVR functions such as pausing playback of the program on the TV monitor in response to detection of the cues, resumes playback of the program on demand based on input from user 20 via input device 22, and correlates input data with applications 16. The present invention does not require any change in the broadcast TV program by the broadcast head-end or program provider. Instead, the recording and control device analyzes the program to detect the cues and correlate the data with external applications.

One example of an application 16 is an interactive version of a trivia game broadcast on TV (e.g., Jeopardy, etc.). A user 20 having a recording and control device 12 with built-in PVR functionality may interact with the trivia program by trying to answer the question while viewing the program at home. As the program is being broadcast, a cue may be part of the TV program signal. The recording and control device may detect this cue and automatically pause the playback of the program for the user. In one embodiment, the cue may be a sound (such as a beep) in the audio component of the program. In another embodiment, the cue may be data within the vertical blanking interval (VBI) of the program signal. In yet another embodiment, the cue may comprise data, such as a text string, within the closed caption (CC) data of the program signal. In any case, the recording and control device analyzes the program signal during playback of the program to detect the cue. In the trivia game example, the cue may be present in the program signal when the on-screen game contestant "buzzes" in to offer an answer to a question posed as part of the game. This answer is called a non-user response herein.

When the cue is detected, the recording and control device automatically pauses playback of the program on the TV monitor 10 while continuing to record the program being broadcast (if the program is being viewed while being broadcast and recorded). While in pause mode, user 20 has the opportunity to enter his or her answer (i.e., the user response or user input data) into an input device coupled to the recording and control device (e.g., a web tablet, a personal digital assistant (PDA), a remote control device, and the like). Since the program playback is automatically paused based on detection of the cue, the user can take his or her time entering the response. When the user is ready to continue with the playback of the program (e.g., continue playing the game) and hear the game contestant's response, the user may resume broadcast using an input device. In one embodiment, this may comprise pressing a button on a conventional remote control device, thereby sending a command to the recording and control device. In another embodiment, playback of the program may resume playback automatically when the user finishes entering his or her response to the question using the input device.

The user's response may be compared by the recording and control device to one or more of several data items. In one embodiment, the recording and control device uses speech recognition to analyze the audio component of the TV program to detect the answer used for comparison. This may involve detailed knowledge of the structure and sequence of the TV program. In another embodiment, the recording and control device analyzes the closed caption text in the program signal to detect the answer. In these two embodiments, no prior set-up or arrangement is required by the broadcaster of the program or the program provider. Further, no changes need to be made to the program itself. In one embodiment, both of these methods may be performed. In yet another embodiment, the recording and control device may communicate with other systems 24 over a network 26 to obtain the answer (correlated to the program being broadcast and the particular time or question within the program currently being viewed). By comparing the user's response to the correct response obtained via any one or more of the above methods, the recording and control device may automatically tabulate correct versus incorrect responses. The recording and control device may accumulate user scores and user interaction statistics, compare them with previous games and/or programs, and compare the user's data with data from other users via other systems 24 and network 26. In one example, the user's scores may be compared with many other users over the Internet.

For embodiments using intelligent cue detection for determining when to pause the playback, and speech recognition and/or closed caption analysis to obtain the correct answers, nationwide or even worldwide games or contests may be implemented without the TV program having to be modified to support the user interaction.

Although an example of a game show has been discussed above, embodiments of the present invention may be used in any application where user interactivity with a program is desired. For example, educational applications such as training and testing applications may also be supported.

Figure 2:
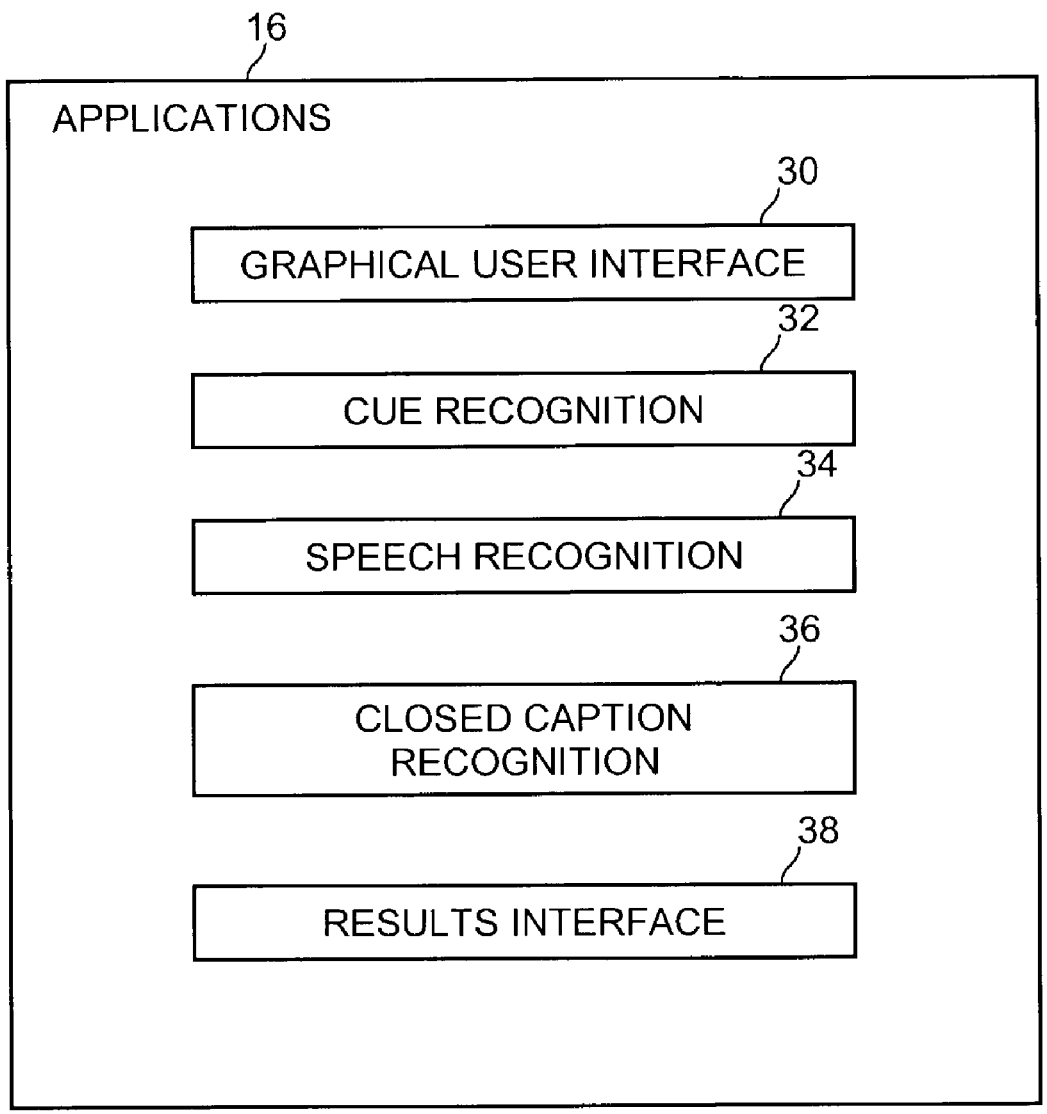
FIG. 2 is a diagram of functions provided by an application according to an embodiment of the present invention.

In one embodiment of recording and control device 12, TV tuner 13 and recorder 15 may comprise conventional components found in a PVR. Application 16 may provide the additional functionality to allow real-time interaction between the user and the broadcast program. FIG. 2 is a diagram of functions provided by an application according to an embodiment of the present invention. Graphical user interface component 30 generates display data to present to the user to commence and manage user interaction with the TV program. Cue recognition component 32 analyzes the incoming TV program signal to detect a cue. In one embodiment, cue recognition component 32 analyzes the audio component of the TV program signal to identify one or more sounds that signify an appropriate cue (e.g., a beep or buzzing sound). In another embodiment, the cue recognition component analyzes the VBI data in the TV program stream to detect the cue. In another embodiment, cue recognition component 32 uses speech recognition component 34 to analyze the audio component of the TV program signal to identify an audible cue in human speech. In another embodiment, cue recognition component 32 uses closed caption recognition component 36 to analyze the closed caption segment of the TV program signal to detect a cue. When a cue is detected, the cue recognition component may direct the recorder to pause playback of the TV program.

Results interface component 38 obtains the correct, non-user response, accepts the user's response, compares the two responses, and tabulates the user's score. In one embodiment, the results interface obtains the correct, non-user response by using speech recognition component 34 to identify the correct response in the audio component of the TV program signal. In another embodiment, the results interface obtains the correct, non-user response by using closed caption recognition component 36 to identify the non-user response in the closed caption portion of the TV program signal. In an embodiment, both methods may be used. In another embodiment, the results interface obtains the correct, non-user response from a web site over the Internet. The web site may comprise data sets of correct responses for each broadcast program. Tabulated scores may also be posted to a web site as part of a nationally or internationally managed game or contest.

Figure 3:
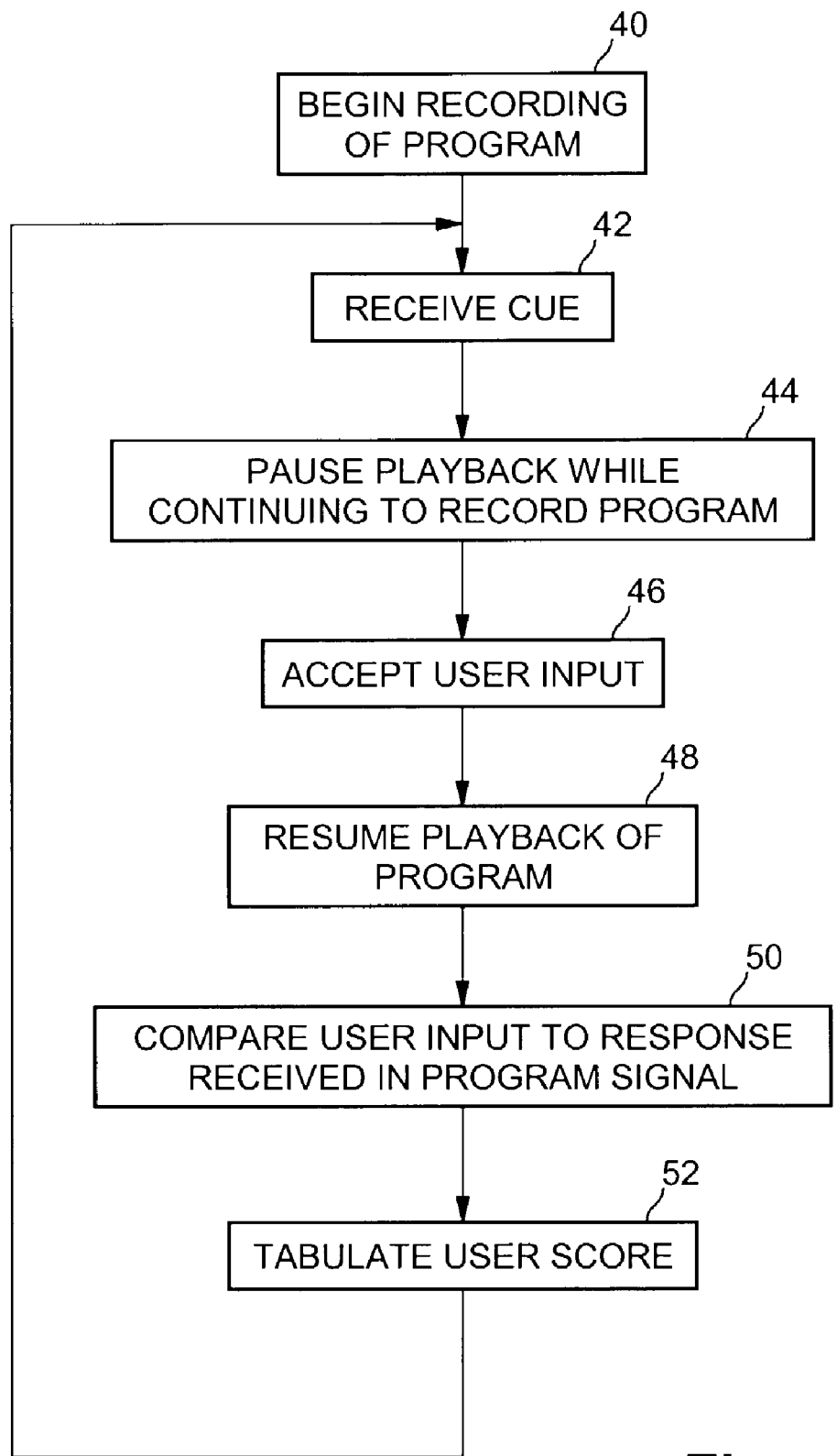
FIG. 3 is a flow diagram of interacting with a recording and control device according to an embodiment of the present invention.

FIG. 3 is a flow diagram for interacting with a recording and control device according to an embodiment of the present invention. At block 40, the recording and control device may begin recording of a program received over the broadcast network. Recording may comprise storing the program in digital form on a hard disk drive within the recording and control device. At block 42, the recording and control device receives and detects a cue within the TV program signal by analyzing the TV program signal. Next, at block 44, the recording and control device pauses playback of the program while continuing to record the program on the hard disk drive. In another embodiment, the entire program may be received and recorded prior to playback for the user. At block 46, the recording and control device accepts user input data. This input data may be in response to or associated in some way with the cue. For example, a question may be asked in the program, and the cue signals an on-screen contestant is attempting to answer the question on the program. The user input data may comprise the user's attempt at answering the question. At block 48, the recording and control device resumes playback of the program. At block 50, the recording and control device compares the user input data received from the user to a non-user response received in the TV program signal or obtained from another source. The non-user response is related to or associated with the cue in the program. In another embodiment, a non-user response may be obtained from another source, such as a web site on the Internet, for example. In one embodiment, the non-user response may be the on-screen contestant's answer or the correct answer, if different than the on-screen contestant's answer. Blocks 48 and 50 may be performed in either order. At block 52, the recording and control device may tabulate the user's score based on one or more of the current user input data, previously supplied user input data, and non-user responses obtained from the program or another source. The user's score may be communicated to others via other systems and networks coupled to the recording and control device.

The techniques described herein are not limited to any particular hardware or software configuration; they may find applicability in any computing or processing environment. The techniques may be implemented in hardware, software, or a combination of the two. The techniques may be implemented in computer programs executing on programmable machines such as set top boxes, analog or digital televisions, PVRs, mobile or stationary computers (PCs), personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each computer program may be implemented in a high level procedural or object oriented programming language to communicate with a processing system. However, computer programs may be implemented in assembly or machine language, if desired. In any case, the language may be compiled or interpreted.

Each such computer program may be stored on a storage medium or device, e.g., compact disk read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of interacting with a television program comprising:
   receiving a transmission including the television program, data and a cue;
   beginning playback of the program for perception by a user;
   analyzing the transmission to detect the cue transmitted with the television program;
   automatically pausing playback of the program without user input in response to detection of the cue;
   accepting user input data in response to the cue;
   automatically resuming playback of the program without further user action in response to receipt of the user input data; and
   comparing the user input data to the data transmitted with the television program.

2. The method of claim 1, further comprising recording the program in digital form while receiving the program over a broadcast network, prior to playback of the program.

3. The method of claim 2, further comprising continuing to record the program being received while pausing playback of the program.

4. The method of claim 1, wherein the cue comprises a sound within an audio component of the program, and further comprising analyzing the audio component of the program to detect the cue.

5. The method of claim 4, wherein the sound comprises human speech, and performing analysis comprises performing speech recognition processing on the audio component of the program to detect the cue.

6. The method of claim 1, wherein the cue comprises vertical blanking interval (VBI) data within a signal for the program, and further comprising analyzing the VBI data of the program to detect the cue.

7. The method of claim 1, wherein the cue comprises closed caption (CC) data within a signal for the program, and further comprising analyzing the CC data of the program to detect the cue.

8. The method of claim 1, wherein the program comprises the non-user response, the non-user response is associated with the cue, and further comprising analyzing the program to detect the non-user response.

9. The method of claim 8, wherein the non-user response comprises speech in an audio component of the program and analyzing the program to detect the non-user response comprises using speech recognition processing to analyze the program to detect the non-user response.

10. The method of claim 8, wherein the non-user response comprises closed caption (CC) data within a signal for the program, and analyzing the program to detect the non-user response comprises analyzing the CC data of the program to detect the non-user response.

11. The method of claim 1, further comprising tabulating a user score using the comparison of the user input data and the non-user response.

12. The method of claim 1, wherein interactivity provided by the program analysis, pausing playback, accepting user input data, resuming playback, and comparing operations supports execution of at least one of an entertainment application and an educational application at a user's site without requiring modification of the television program by a program provider.

13. An article comprising:
a non-transitory storage medium having a plurality of machine accessible instructions, wherein when the instructions are executed by a processor, the instructions provide for interacting with a television program by;
receiving a transmission including the television program, data and a cue;
beginning playback of the program for perception by a user;
analyzing the transmission to detect the cue transmitted of with the television program;
automatically pausing playback of the program without user input in response to detection of the cue;
accepting user input data in response to the cue;
automatically resuming playback of the program without further user action in response to receipt of the user input data; and
comparing the user input data to the data transmitted with the television program.

14. The article of claim 13, further comprising instructions for recording the program in digital form while receiving the program over a broadcast network, prior to playback of the program.

15. The article of claim 14, further comprising instructions for continuing to record the program being received while pausing playback of the program.

16. The article of claim 13, wherein the cue comprises a sound within an audio component of the program, and further comprising instructions for analyzing the audio component of the program to detect the cue.

17. The article of claim 16, wherein the sound comprises human speech, and performing analysis comprises instructions for performing speech recognition processing on the audio component of the program to detect the cue.

18. The article of claim 13, wherein the cue comprises vertical blanking interval (VBI) data within a signal for the program, and further comprising instructions for analyzing the VBI data of the program to detect the cue.

19. The article of claim 13, wherein the cue comprises closed caption (CC) data within a signal for the program, and further comprising instructions for analyzing the CC data of the program to detect the cue.

20. The article of claim 13, wherein the program comprises the non-user response, the non-user response is associated with the cue, and further comprising instructions for analyzing the program to detect the non-user response.

21. The article of claim 20, wherein the non-user response comprises speech in an audio component of the program and instructions for analyzing the program to detect the non-user response comprise instructions for using speech recognition processing to analyze the program to detect the non-user response.

22. The article of claim 20, wherein the non-user response comprises closed caption (CC) data within a signal for the program, and instructions for analyzing the program to detect the non-user response comprise instructions for analyzing the CC data of the program to detect the non-user response.

23. The article of claim 13, further comprising instructions for tabulating a user score using the comparison of the user input data and the non-user response.

24. A recording and control device for recording and interacting with a television program comprising:
a television tuner to receive a program;
a recorder to record the program in digital form;
an application to begin playback of the program for perception by a user, to receive a transmission including the television program, data and a cue, analyze the transmission to detect the cue transmitted with the television program, to automatically pause playback of the program without user input in response to detection of the cue, to accept user input data in response to the cue, to automatically resume playback of the program without further user action in response to receipt of the user input data, and to compare the user input data to the data transmitted with the television program.

25. The recording and control device of claim 24, wherein the cue comprises a sound within an audio component of the program, and wherein the application comprises a cue recognition component to analyze the audio component of the program to detect the cue.

26. The recording and control device of claim 25, wherein the sound comprises human speech, and the application comprises a speech recognition component to perform speech recognition processing on the audio component of the program to detect the cue.

27. The recording and control device of claim 24, wherein the cue comprises closed caption (CC) data within a signal for the program, and the application comprises a closed caption recognition component to analyze the CC data of the program to detect the cue.

28. The recording and control device of claim 24, wherein the program comprises the non-user response, the non-user response is associated with the cue, and wherein the application analyzes the program to detect the non-user response.

29. The recording and control device of claim 28, wherein the non-user response comprises speech in an audio component of the program and the application comprises a speech recognition component to analyze the program to detect the non-user response.

30. The recording and control device of claim 28, wherein the non-user response comprises closed caption (CC) data within a signal for the program, and the application comprises a closed caption recognition component to analyze the CC data of the program to detect the non-user response.

31. The recording and control device of claim 24, wherein the application comprises a results interface to tabulate a user score using the comparison of the user input data and the non-user response.

* * * * *

UNITED STATES PATENT AND TRADEMARK OFFICE
CERTIFICATE OF CORRECTION

PATENT NO.         : 8,230,476 B2
APPLICATION NO.    : 10/245952
DATED              : July 24, 2012
INVENTOR(S)        : Dave P. Singh It is certified that error appears in the above-identified patent and that said Letters Patent is hereby corrected as shown below:

Column 7, line 26:
delete "of"

Signed and Sealed this
Fourth Day of September, 2012

David J. Kappos
*Director of the United States Patent and Trademark Office*